June 29, 1965 D. K. ROE ETAL 3,192,143
ELECTRODIALYTIC DEMINERALIZATION OF WATER
Filed June 28, 1962
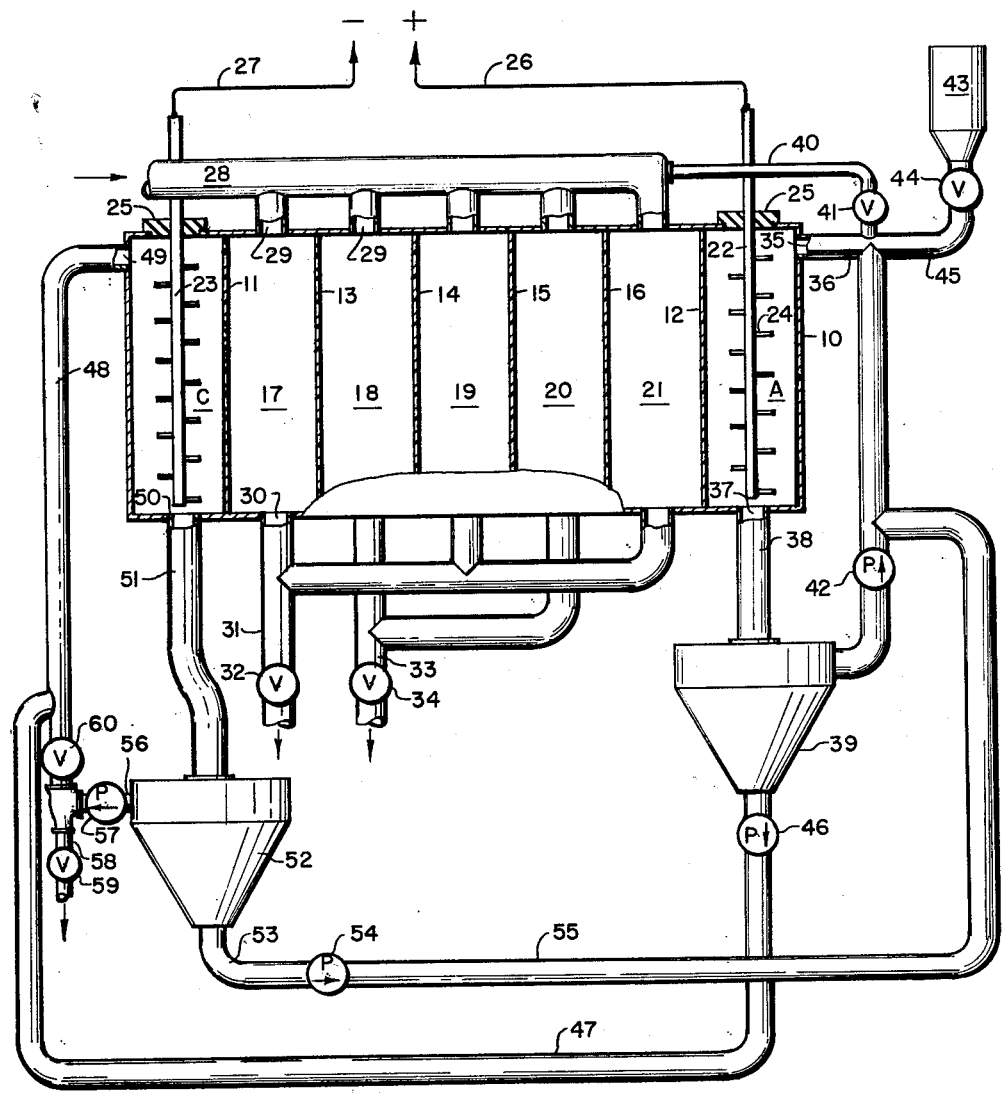
INVENTORS:
DAVID K. ROE
JUSTIN C. DYGERT
BY: Oswald H. Milmore
THEIR ATTORNEY

United States Patent Office 3,192,143
Patented June 29, 1965

3,192,143
ELECTRODIALYTIC DEMINERALIZATION
OF WATER
David K. Roe, Albany, and Justin C. Dygert, Walnut Creek, Calif., assignors to Shell Oil Company, New York, N.Y., a corporation of Delaware
Filed June 28, 1962, Ser. No. 206,068
12 Claims. (Cl. 204—151)

The invention relates to the demineralization of water in an electrodialysis cell and is applicable, inter alia, to the reduction of the salt content of sea water to produce water which is potable or suitable for industrial uses, and the treatment of aqueous industrial effluents to remove therefrom mineral salts contained therein.

It is known to demineralize water by the use of electrodialysis cells, which may include one or a plurality of cells arranged in series between an anode and a cathode. See "Demineralization by Electrodialysis" by J. R. Wilson, published by Butterworths Scientific Publications, London England, 1960. In such techniques there occur at the surfaces of the anode and cathode the following basic processes: adsorption of the anion or cation, electron transfer, and desorption of the electro-chemical reaction product. Any of these three processes can be rate-determining and give rise to polarization, which is measured as an increase in potential drop across the electrode-electrolyte interface as the current is increased. Polarization leads to increased consumption of power, and the economics of such processes depends in part upon the extent to which polarization effects can be reduced. Moreover, there is frequently a tendency for scale-formation, in which the reaction products adhere to the electrodes, making it necessary to resort to special cleaning techniques or to shut down the unit for cleaning or replacement of the electrodes.

A further drawback of the known techniques is that acidic and basic products are formed at the electrodes. For example, when the mineral salt is largely NaCl, HCl and NaOH are formed at the anode and cathode, respectively, leading to problems of corrosion and costs for counter-measures which far exceed the value of the products. The change in pH also frequently results in precipitates which clog the membranes.

Moreover, there is a definite consumption of electrical power associated with the electro-chemical reaction by which the acidic and basic products are formed, which must be expended even if polarization were wholly eliminated.

When $H_2$ and $O_2$ are formed at the electrodes, which occurs in known techniques, relatively high overvoltages are necessary to cause the flow of electric current.

It is the object of the invention to provide an improved method and apparatus for demineralizing water by electrodialysis wherein the consumption of electrical energy is reduced.

A further object is to provide an improved process of the type mentioned wherein the effect of polarization is reduced or obviated, thereby permitting operation over extended periods at steady current flows without or with smaller increase in over-voltage.

Another object is to demineralize water electrodialytically without the formation of gaseous products at the electrodes.

Still another object is to demineralize water electrodialytically without the production of acidic and basic by-products; and, particularly, to recover as a product the salt which is separated from the water.

In summary, according to the invention the water containing ionized minerals salt is flowed through an electrodialysis cell bounded by pervious ion-exchange membranes which are in electrolytic contact with an anode and a cathode situated in anodic and cathodic chambers outside of the cell, an anolyte containing an ionizing liquid and subdivided particles of a substance which forms salts with the anions of the mineral salt is flowed through the anodic chamber in contact with the anode, and the resultant intermediary salt is transferred to and flowed through the cathodic chamber as a constituent of a catholyte containing an ionizing liquid, wherein the ionized minerals, salt and the said substance are reformed by contact with the cathode and from which they are discharged. The reformed products may be separated and the said substance returned to the anodic chamber.

A particular advantage of the invention is that mineral salt discharged from the process is that which occurred originally in the feed water, so that no net electrical power is expended in decomposing water to form gases. Also, the pH of the liquids is not altered and the danger of forming precipitates is obviated.

Another advantage is that the subdivided particles present an extended surface area, many times that of the anode, and are continually renewed to present fresh surfaces. These particles strike the anode to become charged and react with the anions of the mineral salt which migrated through the adjacent membrane into the anodic chamber to form the intermediary salt. In this manner polarization is largely eliminated.

To avoid handling large quantities of liquid it is sometimes preferred to concentrate the intermediary salt prior to transfer. This may be effected either within or outside of the anodic chamber by any suitable physical separation, such as settling or centrifuging, and is facilitated when the intermediary salt has a low solubility in the liquid.

In the cathodic chamber the advantages of extended surface area and renewal of surface area are also effective. The intermediary salt becomes charged upon coming into contact with the cathode and reacts with the cations of the mineral salt which migrated through the adjacent membrane to reform the subdivided substance and the ionized mineral salt. The reformed substance is separated from the salt, either within or outside of the cathodic chamber by any suitable means, such as settling or centrifuging.

The ionizing liquid which is flowed through the anodic and cathodic chambers as the principal constituent of the anolyte and the catholyte may be any liquid in which ionization of inorganic salts occurs, so that the resultant solution is an electrolyte. Although water is used in most instances, certain organic liquids, such as alcohols, tetrahydrofuran, acetone, and halogenated hydrocarbons, are also suitable.

The said subdivided substance which forms salts with the anions of the mineral salt in the feed water is usually a heavy metal which forms an intermediary salt having low solubility in the liquid. It may be in the solid or liquid phase. Preferably the solubility of the intermediary salt in the ionizing liquid should not exceed 10% by weight, and a solubility of under 2% by weight is preferred. However, this is not an absolute requirement, as will appear. When the intermediary salts are but slightly soluble in the liquid they tend to adhere to the surfaces solid particles, so that unreacted parts of the latter are concurrently transferred to the cathodic chamber.

Lead, copper, silver and mercury are the preferred subdivided substances, herein also called the circulated substances, in that their salts, especially the chlorides, have solubilities well under 2% by weight in cold water. However, other metals which are complexed by the anions, especially chlorides, of the mineral salt to form non-ionized intermediary salt with the metals, may also be used. Examples are tin and cobalt, which form water-soluble, non-ionized salts. These are preferably used when the intermediary salts are not concentrated and the total anolyte discharged from the anodic flow chamber is transferred to the cathodic flow chamber.

It is also possible to use certain non-metals, e.g., organic compounds which are easily chlorinated. A specific example is toluene, which forms liquid chlorides immiscible in the water.

The invention will be further described with reference to the accompanying drawing forming a part of this specification and illustrating a preferred embodiment of the apparatus. The single view is an elevation, parts appearing in section.

Referring to the drawing, the apparatus comprises a vessel 10 partitioned by pervious ion-exchange membranes 11 and 12 to define an anodic flow chamber A and a cathodic flow chamber C and at least one intermediate electrodialysis cell. Optionally, as illustrated, an additional number of membranes 13, 14, 15 and 16 are provided, to define cells 17–21. Preferably an even number of additional membranes are used to define an odd number of cells. The membranes may be of any micro-porous material, such as ceramic, sintered glass or a permeable resin, which permits the passage of ions but substantially separates liquids on opposite sides. The membranes 13 and 15, when used, should be anion-selective and, in such case, the membrane 12 may if desired also be of this type. Anion-selective membranes are those micro-porous substances which contain a high number of fixed positive charges, such as quaternary ammonium groups. An example is the material available under the trade name "Nepton AR 111." The membranes 14 and 16, when used, should be cation-selective and, in such case, the membrane 11 may if desired also be of this type. Cation-selective membranes are those micro-porous substances which contain a high number of fixed negative charges, such as sulfonates. An example is the material available under the trade name "Nepton CR 61." The flow chambers A and C contain continuous parent anode and cathode electrodes 22 and 23, respectively, and may be of any suitable electrically conductive material, such as nickel, stainless steel or carbon. They may be shaped to provide extended or irregular outlines to facilitate contact with the particles, as will be described, as by providing projections 24 or other suitable extended structures. The electrodes are electrically insulated from the vessel by insulating bushings 25 and are connected by electrical circuits 26, 27, to a source of D.C. current, not shown.

The feed water to be demineralized, containing ionized mineral salts, is admitted to a manifold 28 from which it flows via branch pipes into the top inlet openings 29 of several cells 17–21. The bottom outlet openings 30 of the cell or cells adjoining the membranes 11 and 12 and, when more than three cells are provided, of the alternate intervening cells (e.g., the odd-numbered cells in the embodiment shown) are connected to a common demineralized-water discharge pipe 31 having a flow-control valve 32. The bottom outlets of the other cells (if any, e.g., the even-numbered cells) are connected to a common salt-concentrate discharge pipe 33 having a flow-control valve 34. It is evident that additional valves (not shown) for controlling the individual flows through the cells may be provided.

The anodic flow chamber A has at the top an inlet opening 35 connected to receive an anolyte from a pipe 36 and, at the bottom, an outlet opening 37 connected to a pipe 38 and a separator 39 of any suitable type, such as a settler or inertial type separator, e.g., a hydrocyclone. As will appear, the separator 39 may in some instances be omitted. The pipe 36 is connected to receive water from the manifold 28 via a pipe 40 and valve 41 and further, from the separator 39 via a circulating pump 42. Initially or intermittently the circulated substance in solid or liquid form, such as lead, copper or silver powder, granules of carbonyl iron coated with one of these metals, or mercury, is supplied to the pipe 36 from a reservoir 43 through a valve 44 and pipe 45. The bottom outlet of the separator 39 discharges a slurry of resultant intermediary salts to a pump 46 for flow through a transfer pipe 47 to a circulating pipe 48 at the cathode side.

The cathodic flow chamber C has at the top an inlet opening 49 connected to the pipe 48 to receive catholyte and, at the bottom, an outlet opening 50 connected to a pipe 51 and a separator 52 of any type suitable for separating the reformed circulated substance from minerals separated from the water. The type of separator to be used depends partly upon the operating conditions, as will appear. Thus, it may be a settler or an inertial type separator, as the separator 39, but may include additional means for stripping the minerals and scale from the circulated substance when it is a metal in the solid state, e.g., by washing. The circulated substance is discharged from the separator 52 via a pipe 53 and returned by a pump 54 and pipe 55 to the pipe 36. The liquid is discharged via a pipe 56 and pump 57 which delivers a part of the liquid to the pipe 48 for recirculation. A branch pipe 58 having a valve 59 is connected to the pump discharge for bleeding off a saline solution. A valve 60 may optionally be provided between the pipes 48 and 58.

The feed water to be demineralized in most instances contains NaCl. However, instead of or in addition it may contain such salts as the halides, e.g., chlorides and iodides, or the sulphates or carbonates of alkali metals, e.g., sodium, potassium and magnesium.

Operation of the system will be described with reference to the desalination of water containing NaCl, using lead as the circulated substance and water as the ionizing liquid. The feed water to be treated is supplied to the manifold 28 and enters the several cells 17–21 from the top. The electrodes 22 and 23 are made anodic and cathodic by the circuits 26, 27. The chambers A and C and the associated pipes are filled with water via the pipe 40, the pumps 42, 46, 54 and 56 are placed into operation, and lead powder from the reservoir 43 is charged into the water in the pipe 36 to form the anolyte. The liquids in the chambers A and C and in the cells 17–21 are electrolytes, and the anode and cathode 22 and 23 are therefore in electrolytic contact with each pair of membranes defining a cell. This causes the migrations of anions toward the anodic chamber and of cations toward the cathodic chamber. When several cells are provided at least the membranes 13–16 are ion-selective, as described. The anions can pass only through the membranes 12, 13 and 15, while the cations can pass only through the membranes 11, 14 and 16. This ion-selective property of the membranes prevents the flow of salt ions into the odd-numbered cells. As a result of this selective migration in the water in the odd-numbered cells becomes progressively demineralized in flowing toward the bottom. The even-numbered cells receive both anions and cations from the adjacent cells and the mineral content of the water therein increases.

The suspension of lead particles flows through the chamber A and the particles become positively charged on making contact with the parent anode 22. They become partly electro-chemically oxidized and form intermediary salts with the anions of the mineral salt in the feed water which passed through the membrane 12, e.g., $PbCl_2$. This intermediary salt is concentrated in the separator 39 and a slurry thereof is introduced via pump 46 and pipes 47 and 48 into the chamber C. Here the salt particles engage the cathode, receive negative charges and the lead is reformed by electro-chemical reduction; at the same time the anion of the intermediary salt is released and it reforms ionized mineral salt of the feed water together with the cations thereof which passed through the membrane 11 into the chamber C. The resultant mixture is discharged continuously to the separator 52, from which the reformed solid lead is returned to the chamber A by pump 54. A part of the liquid in the pipe 56 is, in one embodiment of the process, returned to the pipe 48 through the valve 60 and the salt content in the chamber C then rises. Another part is discharged through the pipe 58, the valve 59 being controlled to discharge as much salt as is reformed in the chamber C. An amount of make-up water equal to that discharged through the pipe 58 is continuously admitted to the system via the pipe 40 and the valve 41.

It is, according to another embodiment of the process, possible to discharge the total stream from the pipe 56 via the pipe 58; valve 60 is then closed. It then becomes necessary to increase the liquid flows through the pipes 40 and 47. The latter flow may be so large that it includes the total liquid flowing through the pipe 38, obviating the need for the separator 39. However, by providing the separator 39 it is possible to control the liquid flow rate through the chamber A independently of the flow through the chamber C.

In either embodiment of the process, demineralized water is discharged through the pipe 31 and water containing the original salt, e.g., NaCl, of the feed water in more concentrated form is discharged through the pipes 33 and 58.

The half-reactions occurring may be exemplified for the case where the circulated substance is lead and the mineral salt is NaCl, it being evident that equivalent reactions occur with other substances and/or salts:

In the anolyte the reaction in the chamber A is

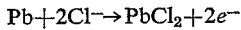

and in the catholyte in chamber B it is

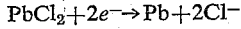

It is evident that the downward flow directions of the water being treated and of the anolyte and catholyte are not restrictive of the invention.

By operating according to the invention, the large overvoltages required in the usual cells for the formation of $H_2$ and $O_2$ at the cathode and anode, respectively, are avoided because overvoltages which do not involve the formation of gases are far lower. Moreover, by the use of dispersed particles at both electrodes a lower overvoltage can be used for the same current flow. These factors reduce the power consumption. Of course the resistance drop through the cell or cells is a function of the membrane resistance and the solution resistance, and no change in this parameter is realized.

A further very significant advantage is that there is no change in the pH in the anolyte and catholyte as a result of the two half-reactions. This greatly reduces the possibility of a precipitate, such as $Mg(OH)_2$ and $Ca(OH)_2$ on the membrane surfaces adjacent to the cathode. This has been a problem in known commercial electrodialysis cells.

We claim as our invention:

1. The electrodialytic process for demineralizing water which comprises the steps of:
    (a) flowing a current of water containing ionized mineral salt through an electrodialysis cell bounded by pervious ion-exchange membranes,
    (b) establishing an electric potential between an anode and a cathode which are situated in separate, respectively anodic and cathodic flow zones having electrolytic contact with said membranes and thereby causing electro-migration of ions of said mineral salt through the membranes and into said flow zones,
    (c) flowing through the anodic flow zone in contact with said anode an anolyte containing a liquid in which ionization of inorganic salts occurs and a subdivided substance which is electro-chemically oxidizable to form an intermediary salt with the anion of said mineral salt and therein forming said intermediary salt by electro-chemical oxidation of said substance,
    (d) transferring the said intermediary salt to and flowing it through the cathodic flow zone together with a liquid in which ionization of inorganic salts occurs and in contact with said cathode, therein reforming the said ionized mineral salt and the said substance by electro-chemical reduction of the said substance, and discharging the reformed materials from the cathodic flow zone, and
    (e) discharging water of reduced mineral content from said cell.

2. In combination with the process defined in claim 1, the steps of
    (a) separating the reformed substance from the reformed mineral salt and
    (b) returning the separated substance to the anodic flow zone as a part of said anolyte.

3. In combination with the process defined in claim 1, the step of concentrating the intermediary salt before transferring it to the cathodic flow zone.

4. Process as defined in claim 1 wherein the said substance is a heavy metal which forms an intermediary salt with said anion of the mineral salt, which intermediary salt has a solubility in the said ionizing liquid below 10% by weight.

5. Process as defined in claim 1 wherein said ionizing liquid is water.

6. The electrodialytic process for demineralizing water which comprises the steps of:
    (a) flowing a current of water containing ionized mineral salt through an electrodialysis cell bounded by pervious ion-exchange membranes,
    (b) establishing an electric potential between an anode and a cathode which are situated in separate, respectively anodic and cathodic flow zones having electrolytic contact with said membranes and thereby causing electro-migration of ions of said mineral salt through the membranes and into said flow zones,
    (c) flowing through the anodic flow zone in contact with said anode a suspension in water of subdivided metal and therein forming an intermediary salt of said metal and the anion of said mineral salt by electro-chemical oxidation of said metal,
    (d) discharging the water and said intermediary salt from said anodic flow zone,
    (e) transferring the intermediary salt to and flowing it through the cathodic flow zone together with water in contact with said cathode, therein reforming the said ionized mineral salt and the said metal by electro-chemical reduction of the said metal, and discharging the reformed materials from the cathodic flow zone,
    (f) separating the reformed metal from the reformed salt,
    (g) returning the separated metal to the anodic flow zone as a part of said suspension, and
    (h) discharging water of reduced mineral content from the said cell.

7. Process as defined in claim 6 wherein:
    (a) said metal is one which forms an intermediary salt with said anion of the mineral salt, which intermediary salt has a solubility in water below 10% by weight, and
    (b) the mixture of the intermediary salt and water is concentrated with respect to said salt after discharge from the anodic flow zone and prior to entry into the cathodic flow zone.

8. Process as defined in claim 6 wherein said metal is a member of the class consisting of lead, silver, copper and mercury.

9. Electrodialysis apparatus for demineralizing water which comprises:
    (a) a vessel which contains a plurality of pervious, ion-exchange membranes defining therebetween at least one electrodialysis cell, an anodic flow chamber to one side of said cell and a cathodic flow chamber to the other side of the cell,
    (b) an anode and a cathode electrode situated respectively in said anodic and cathodic flow chambers, and means for applying an electric potential to said electrodes, (c) means for flowing water containing ionized mineral salt through said cell, said means including an outlet for the discharge of water of reduced mineral content, (d) means for flowing through said anodic flow chamber in contact with said anode an anolyte containing a liquid in which ionization of inorganic salts occurs and a subdivided substance which is electro-chemically oxidizable to form within said anodic flow chamber an intermediary salt with the anion of said mineral salt, (e) means for supplying said substance to the anolyte, (f) means for transferring said intermediary salt discharged from the anodic flow chamber to the cathodic flow chamber, (g) means for flowing through said cathodic flow chamber in contact with said cathode a catholyte containing said transferred intermediary salt and a liquid in which ionization of inorganic salts occurs, for reforming said ionized mineral salt and the said solid substance therein, (h) means for separating said reformed substance from the reformed mineral salt, and (i) means for returning the separated substance to the anodic flow chamber and discharging from the apparatus the reformed mineral salt.

10. Electrodialysis apparatus for demineralizing water which comprises:

(a) a vessel which contains a plurality of pervious, ion-exchange membranes defining therebetween at least one electrodialysis cell, an anodic flow chamber to one side of said cell and a cathodic flow chamber to the other side of the cell, (b) an anode and a cathode electrode situated respectively in said anodic and cathodic flow chambers, and means for applying an electric potential to said electrodes, (c) means for flowing water containing ionized mineral salt through said cell, said means including an outlet for the discharge of water of reduced mineral content, (d) means for flowing through said anodic flow chamber a suspension in water of particles of a heavy metal in contact with said anode to form an intermediary salt of said metal and the anion of said mineral salt, and an outlet for discharging said intermediary salt, from said chamber, (e) means for introducing the intermediary salt discharged from said anodic flow chamber to the cathodic flow chamber in isolation from said water flowing through said cell and flowing it and water through the cathodic flow chamber in contact with said cathode for reforming the said ionized mineral salt and the said metal, and an outlet for discharging the reformed salt and metal from said chamber.

(f) means for separating the reformed metal from the reformed salt in the mixture thereof discharged from the cathodic flow chamber, and (g) means for returning the separated metal to the anodic flow chamber in isolation to said water flowing through said cell.

11. In combination with the apparatus defined in claim 10, means for concentrating the intermediary salt in the mixture thereof with water after discharge from said anodic flow chamber and before flowing it through the cathodic flow chamber.

12. Electrodialysis apparatus for demineralizing water which comprises:

(a) a vessel which contains a plurality of pervious, ion-exchange membranes defining therebetween at least one electrodialysis cell, an anodic flow chamber to one side of said cell and a cathodic flow chamber to the other side of the cell, (b) an anode and a cathode electrode situated respectively in said anodic and cathodic flow chambers, and means for applying an electric potential to said electrodes, (c) means for flowing water containing ionized mineral salt through said cell, said means including an outlet for the discharge of water of reduced mineral content, (d) means for flowing through said anodic flow chamber in contact with said anode an anolyte containing a liquid in which ionization of inorganic salts occurs and a subdivided substance which is electro-chemically oxidizable to form within said anodic flow chamber an intermediary salt with the anion of said mineral salt, (e) means for supplying said substance to the anolyte, (f) means for transferring said intermediary salt discharged from the anodic flow chamber to the cathodic flow chamber, (g) means for flowing through said cathodic flow chamber in contact with said cathode a catholyte containing said transferred intermediary salt and a liquid in which ionization of inorganic salts occurs, for reforming said ionized mineral salt and the said solid substance therein, (h) means for concentrating the said intermediary salt discharged from the anodic flow chamber, (i) means for returning liquid separated from the concentrated intermediary salt to the anodic flow chamber, and (j) means for discharging from the apparatus the reformed mineral salt.

References Cited by the Examiner

UNITED STATES PATENTS

| | | | |
|---|---|---|---|
| 2,815,320 | 12/57 | Kollsman | 204—189 |
| 3,003,940 | 10/61 | Mason et al. | 204—180 |

WINSTON A. DOUGLAS, *Primary Examiner.*

JOHN H. MACK, MURRAY TILLMAN, *Examiners.*